UNITED STATES PATENT OFFICE.

EGBERT CORNELIS SUTHERLAND, OF DEVENTER, NETHERLANDS, ASSIGNOR TO NAAMLOOZE VENNOOTSCHAP INDUSTRIEELE MAATSCHAPPIJ VOORHEEN NOURY & VAN DER LANDE, OF DEVENTER, NETHERLANDS, A CORPORATION OF NETHERLANDS.

PROCESS FOR TREATING MEAL OR FLOUR AND MILLING PRODUCTS.

1,380,334.  Specification of Letters Patent.  Patented May 31, 1921.

No Drawing.  Application filed December 12, 1916.  Serial No. 136,551.

*To all whom it may concern:*

Be it known that I, EGBERT CORNELIS SUTHERLAND, chemist, residing at Deventer, No. 60, Worp, the Netherlands, have invented certain new and useful Improvements in and Relating to a Process for Treating Meal or Flour and Milling Products, of which the following is a specification.

My invention relates to a process for treating meal or flour and milling products of different origin and has for its object to improve the color, the baking qualities and the durability of these products.

By the term "baking qualities" the property is meant that dough prepared from meal treated in this way swells stronger than dough from untreated meal and produces loaves which are proportionally larger.

The process may be applied to all kinds of meal or flour and milling products obtained from grain, as well as to all intermediate products. It may also be applied to meal from beans and tubers, which latter application has the important advantage that not only the color and the durability of such meals are improved, but that also the disagreeable odor and flavor, often adhering to such meals, fully disappear. This is for instance the case with meal from soya beans and from manioc roots.

Flour from grain is in the first place judged by its baking qualities and its color, its durability being moreover a very important feature.

Many efforts have been made to improve the baking qualities of meal and flour, however without satisfactory results. From the methods proposed for improving the color of flour and milling products from grain, those in which dioxid of nitrogen is used, have proved to be practicable to a certain degree. It soon turned out, however, that the improvement in color attained thereby was not very important, while it was difficult to control the process; the result being a too strong reaction of the nitrogen dioxid, by which reaction the meal assumed a brown color, so that in some respects the quality of the treated meal was poorer than that of the untreated. Besides it was supposed, rightly or wrongly, that the reaction of the nitrogen dioxid gave rise to the formation of poisonous or noxious substances in the meal and that its digestibility was rendered more difficult.

That is why in some places the processes in which nitrogen dioxid is used have fallen into disuse, and as matters stand at present the milling trade does not yet possess a useful and entirely satisfactory process for improving the quality of meal and flour as to its baking qualities, color and durability.

It has now been found by applicant that an improvement in the color of meal and flour, including inferior qualities thereof, together with preservation of the flour or meal, and an improvement of the baking qualities, are obtained by mixing the meal or flour with a peroxidized compound of the nature of a "true" inorganic or organic peroxid, a peracid, or a persalt, the meal being thereupon subjected to a treatment by which the said peroxidized compound in the mixture is decomposed with the liberation of active oxygen, which latter reacts very energetically on the coloring substance of the meal, or flour, so that it assumes a bright and lively color.

The expression "true peroxids" is intended to cover those inorganic peroxids which may be considered to be salts of hydrogen peroxid, and this compound itself, as well as organic peroxids. According to their nature the peroxids, peracids and persalts may be added either as such, or in solution or suspension. I do not limit myself, either to special representatives of the groups of compounds mentioned, nor to a special form in which they are added to the meal or flour. It must further be understood that mixtures of said suitable peroxidized compounds are intended to be covered by my claims. I do not include, however, in what I claim, those inorganic peroxids like nitrogen peroxid, which cannot be considered to be salts or derivatives of hydrogen peroxid.

Only an exceedingly small quantity of the peroxidized compound is required to obtain satisfactory results. The quantity required (relatively to the quantity of the meal or flour) may be varied according to the kind and the quality of the meal or flour to be treated. The treatment by which the peroxidized compound is decomposed may be of a physical or of a chemical nature. It may advantageously consist in a treatment with actinic rays, e. g. such as are emitted by a mercury vapor lamp.

After the treatment according to my invention, the meal or flour is found to be very completely sterilized and and is also found to have obtained a good durability, while a further advantage of the process is, that the meal, or flour, does not assume a bad odor and flavor when kept, in contradistinction to untreated meal, or flour, which often assumes these properties before turning really bad, by the action of molds and bacteria.

The improvement of the baking qualities is certainly partly to be ascribed to the fact, that living micro-organisms, having an unfavorable influence on the fermentation, are no longer present in the treated meal or flour. On the other hand the stiffness and elasticity of the gluten are increased.

The process may be executed as follows:

Meal, e. g. mixed bolted meal—i. e. meal obtained by combining all the different kinds of products of the factory, the bran and the germs only excepted—obtained from a mixture of La Plata—, Kansas—and Montana wheat (which mixture has already a rather light color) is mixed with 0.7% (by weight) of a 3% solution of hydrogen peroxid, i. e. with about 0.02% $H_2O_2$. This meal is transported by a belt-conveyer through a room in which mercury vapor lamps for 220 volts are placed. The thickness of the layer of meal on the belt may be about 3 cm., while the speed of the belt is regulated in such a way that 200 kg. of meal will pass through the room per lamp and per hour.

No claim is made herein to any treatment of flour, or meal, or other milling products, with nitrogen oxids or with ozone.

In my copending application 426,223, filed November 24, 1920, I have claimed the bleaching and improvement of flour by the addition of organic peroxids, and also an intermediate product comprising a cereal milling product mixed with a peroxid compound, such subject matter being referred to in the present case, but not specifically claimed herein.

Having thus described my invention, what I claim as new and desire to secure by Letters Patent is:

1. A process of treating flour, meal, and milling products, which comprises mixing the product with a reagent containing as its essential constituent, a peroxid compound, and decomposing said compound while mixed with said product, under conditions capable of producing active oxygen in contact therewith, and while maintaining substantially the normal consistency of said product.

2. A process of treating flour, meal, and milling products, which comprises mixing the product with a "true" peroxid, and decomposing this compound while mixed with said product, under conditions capable of producing active oxygen in contact therewith, and while maintaining substantially the normal consistency of said product.

3. A process of treating flour, meal and milling products, which comprises mixing the product with a "true" inorganic peroxid, and decomposing such peroxid while mixed with said product, under conditions capable of producing active oxygen in contact therewith, and while maintaining substantially the normal consistency of said product.

4. A process of treating flour, meal, and milling products which comprises mixing the product with an aqueous solution of a soluble "true" inorganic peroxid, in amount insufficient to wet said product, decomposing this peroxid while mixed with said product, under conditions capable of producing active oxygen in contact therewith, while maintaining the milling product otherwise in its normal physical condition.

5. A process of treating flour, meal, and milling products, which comprises mixing the said product with an aqueous solution of hydrogen peroxid, in amount insufficient to wet said product, and decomposing the hydrogen peroxid while mixed with said product, under conditions capable of producing active oxygen in contact therewith.

6. A process of treating flour, meal and milling products, consisting in mixing the product with a small proportion of a peroxidized compound, and decomposing this compound, with the liberation of nascent oxygen while maintaining said milling product in a pulverulent condition and at a temperature below that necessary to cook the same.

7. A process of treating flour, meal and milling products, which comprises mixing the product with a few hundredths of a per cent. of a peroxid compound, and decomposing the peroxid compound, with the production of nascent oxygen, while leaving the said milling product in substantially its normal pulverulent condition.

8. A process of treating flour, meal and milling products, consisting in mixing the product with a few hundredths of a per cent. of an inorganic peroxid, and decomposing the peroxid, with the production of free oxygen in a highly active state, in contact with the said product, while leaving the said milling product in substantially its normal pulverulent condition.

9. A process of treating flour, meal and milling products, which comprises mixing the product with an aqueous solution of a soluble "true" inorganic peroxid, in amount insufficient to wet the said product, and decomposing the peroxid, with the production of free oxygen in a highly active state, while maintaining said milling product in a pulverulent condition and at a temperature below that necessary to cook the same.

10. A process of treating flour, meal and milling products, which comprises mixing the said product with an aqueous solution of hydrogen peroxid, in amount insufficient to wet the said product, and decomposing the hydrogen peroxid, with the production of free oxygen in a highly active state, while maintaining said milling product in a pulverulent condition and at a temperature below that necessary to cook the same.

11. A process for treating flour, meal and milling products, consisting in mixing the product with a peroxidized compound, spreading out the mixture in the form of a layer upon a belt-conveyer and moving the belt-conveyer with the mixture through a room in which the mixture is exposed to actinic rays.

12. A process for treating flour, meal and milling products, consisting in mixing the product with a peroxidized compound, and subjecting the entire mixture to actinic light.

13. A process for treating flour, meal and milling products, consisting in mixing the product with a peroxidized compound and decomposing this compound, when in the mixture, by subjecting the same to actinic rays.

14. A process for treating flour, meal and milling products, consisting in mixing the product with a "true" inorganic peroxid and decomposing this peroxid, when in the mixture, by subjecting the same to actinic rays.

15. A process for treating flour, meal and milling products, consisting in mixing the product with an aqueous solution of hydrogen peroxid and thereupon decomposing the hydrogen peroxid, when in the mixture, by subjecting the same to actinic rays.

16. The process of treating milling products of the nature set forth, and similar material, which comprises bleaching the same by treatment with a powerful oxidizing agent in conjunction with the step of subjecting the same while in a pulverulent state to the action of a reaction-accelerating influence, whereby the nascent oxidizing effect is intensified, and the milling product is bleached by the nascent oxygen liberated.

17. The treatment of milling products while in a finely-divided state, with ultraviolet rays while in the presence of reactive oxidizing agents.

In testimony whereof I affix my signature in presence of two witnesses.

EGBERT CORNELIS SUTHERLAND.

Witnesses:
H. J. Kooy,
A. E. Jurriaanse.

It is hereby certified that in Letters Patent No. 1,380,334, granted May 31, 1921, upon the application of Egbert Cornelis Sutherland, of Deventer, Netherlands, for an improvement in "Processes for Treating Meal or Flour and Milling Products," an error appears in the printed specification requiring correction as follows: Page 3, line 49, claim 15, strike out the word "thereupon;" and that the said Letters Patent should be read with this correction therein that the same may conform to the record of the case in the Patent Office.

Signed and sealed this 12th day of July, A. D., 1921.

[SEAL.]                                                        KARL FENNING,

*Acting Commissioner of Patents.*

Cl. 83—42.